United States Patent
Degnan et al.

(10) Patent No.: US 6,190,532 B1
(45) Date of Patent: Feb. 20, 2001

(54) PRODUCTION OF HIGH VISCOSITY INDEX LUBRICANTS

(75) Inventors: Thomas F. Degnan, Morrestown; Dominick N. Mazzone, Wenonah, both of NJ (US)

(73) Assignee: Mobil Oil Corporation, New York, NY (US)

( * ) Notice: Under 35 U.S.C. 154(b), the term of this patent shall be extended for 0 days.

(21) Appl. No.: 09/439,666

(22) Filed: Nov. 15, 1999

Related U.S. Application Data (63) Continuation-in-part of application No. 09/115,255, filed on Jul. 13, 1998, now abandoned.

(51) Int. Cl.$^7$ .................................................. C10G 13/01
(52) U.S. Cl. ................. 208/27; 208/18; 208/49; 208/58; 208/96; 208/59; 208/97; 208/111.13; 585/739
(58) Field of Search ................. 268/27, 18, 49, 268/58, 96, 59, 97, 111.13; 585/539

(56) References Cited

U.S. PATENT DOCUMENTS 4,601,993 * 7/1986 Chu ....................................... 208/111
4,975,177 * 12/1990 Garwood ............................... 208/19

* cited by examiner

Primary Examiner—Helane Myers (57) ABSTRACT

Petroleum waxes are converted to high viscosity index lubricants by a hydroisomerization process in which the wax feed is subjected to hydroisomerization over a low acidity molecular sieve isomerization catalyst (the molecular sieve being preferably a zeolite) which effects a preferential isomerization on the paraffin components in the feed to less waxy, high VI isoparaffins. The hydroisomerization is operated at high pressure, at least 1000 psig hydrogen partial pressure (reactor inlet) using a zeolite catalyst, preferably a noble metal containing zeolite beta catalyst which contains boron as a framework component of the zeolite to give a low alpha value, typically below 10. The hydroisomerization is carried out at with a 650° F.+ conversion in the range of 10 to 40 weight percent of the feed. A final dewaxing step to target pour point may be used with relatively low loss, typically no more than 15 weight percent, during this dewaxing. The final products typically have VI values in excess of 125 and usually in the range of 130 to and are characterized by exceptional stability.

12 Claims, 2 Drawing Sheets

PRODUCTION OF HIGH VISCOSITY INDEX LUBRICANTS

CROSS-REFERENCE TO RELATED APPLICATIONS

This application is a continuation in part application of Ser. No. 09/115,255, filed Jul. 13, 1998 now abandoned.

FIELD OF THE INVENTION

This invention relates to the production of high viscosity index lubricants by hydrocracking petroleum waxes.

BACKGROUND OF THE INVENTION

Mineral oil based lubricants are conventionally produced by a separative sequence carried out in the petroleum refinery which comprises fractionation of a paraffinic crude oil under atmospheric pressure followed by fractionation under vacuum to produce distillate fractions (neutral oils) and a residual fraction which, after deasphalting and severe solvent treatment may also be used as a lubricant basestock usually referred to as bright stock. Neutral oils, after solvent extraction to remove low viscosity index (V.I.) components are conventionally subjected to dewaxing, either by solvent or catalytic dewaxing processes, to the desired pour point, after which the dewaxed lubestock may be hydrofinished to improve stability and remove color bodies. This conventional technique relies upon the selection and use of crude stocks, usually of a paraffinic character, which produce the desired lube fractions of the desired qualities in adequate amounts. The range of permissible crude sources may, however, be extended by the lube hydrocracking process which is capable of utilizing crude stocks of marginal or poor quality, usually with a higher aromatic content than the best paraffinic crudes. The lube hydrocracking process, which is well established in the petroleum refining industry, generally comprises an initial hydrocracking step carried out under high pressure in the presence of a bifunctional catalyst which effects partial saturation and ring opening of the aromatic components which are present in the feed. The hydrocracked product is then subjected to dewaxing in order to reach the target pour point since the products from the initial hydrocracking step which are paraffinic in character include components with a relatively high pour point which need to be removed in the dewaxing step.

Current trends in the design of automotive engines are associated with higher operating temperatures as the efficiency of the engines increases and these higher operating temperatures require successively higher quality lubricants. One of the requirements is for higher viscosity indices (V.I.) in order to reduce the effects of the higher operating temperatures on the viscosity of the engine lubricants. High V.I. values have conventionally been attained by the use of V.I. improvers e.g. polyacrylates, but there is a limit to the degree of improvement which may be effected in this way; in addition, V.I. improvers tend to undergo degradation under the effects of high temperatures and high shear rates encountered in the engine, the more stressing conditions encountered in high efficiency engines result in even faster degradation of oils which employ significant amounts of V.I. improvers. Thus, there is a continuing need for automotive lubricants which are based on fluids of high viscosity index and which are stable to the high temperature, high shear rate conditions encountered in modern engines.

Synthetic lubricants produced by the polymerization of olefins in the presence of certain catalysts have been shown to possess excellent V.I. values, but they are expensive to produce by the conventional synthetic procedures and usually require expensive starting materials. There is therefore a need for the production of high V.I. lubricants from mineral oil stocks which may be produced by techniques comparable to those presently employed in petroleum refineries.

In theory, as well as in practice, lubricants should be highly paraffinic in nature since paraffins possess the desirable combination of low viscosity and high viscosity index. Normal paraffins and slightly branched paraffins e.g. n-methyl paraffins, are waxy materials which confer an unacceptably high pour point on the lube stock and are therefore removed during the dewaxing operations in the conventional refining process described above. It is, however, possible to process waxy feeds in order to retain many of the benefits of their paraffinic character while overcoming the undesirable pour point characteristic. A severe hydrotreating process for manufacturing lube oils of high viscosity index is disclosed in *Developments in Lubrication*, PD 19(2), 221–228, S. Bull et al, and in this process, waxy feeds such as waxy distillates, deasphalted oils and slack waxes are subjected to a two-stage hydroprocessing operation in which an initial hydrotreating unit processes the feeds in blocked operation with the first stage operating under higher temperature conditions to effect selective removal of the undesirable aromatic compounds by hydrocracking and hydrogenation. The second stage operates under relatively milder conditions of reduced temperature at which hydrogenation predominates, to adjust the total aromatic content and influence the distribution of aromatic types in the final product. The viscosity and flash point of the base oil are then controlled by topping in a subsequent redistillation step after which the pour point of the final base oil is controlled by dewaxing in a solvent dewaxing (MEK-toluene) unit. The slack waxes removed from the dewaxer may be reprocessed to produce a base oil of high viscosity index.

Processes of this type, employing a waxy feed which is subjected to hydrocracking over an amorphous bifunctional catalyst such as nickel-tungsten on alumina or silica-alumina are disclosed, for example, in British Patents Nos. 1,429,494, 1,429,291 and 1,493,620 and U.S. Pat. Nos. 3,830,273, 3,776,839, 3,794,580, and 3,682,813. In the process described in GB 1,429,494, a slack wax produced by the dewaxing of a waxy feed is subjected to hydrocracking over a bifunctional hydrocracking catalyst at hydrogen pressures of 2,000 psig of higher, followed by dewaxing of the hydrocracked product to obtain the desired pour point. Dewaxing is stated to be preferably carried out by the solvent process with recycle of the separated wax to the hydrocracking step.

In processes of this kind, the hydrocracking catalyst is typically a bifunctional catalyst containing a metal hydrogenation component on an amorphous acidic support. The metal component is usually a combination of base metals, with one metal selected from the iron group (Group VIII) and one metal from Group VIB of the Periodic Table, for example, nickel in combination with molybdenum or tungsten. Modifiers such as phosphorus or boron may be present, as described in GB 1,350,257, GB 1,342,499, GB 1,440,230, FR 2,123,235, FR 2,124,138 and EP 199,394. Boron may also be used as a modifier as described in GB 1,440,230. The activity of the catalyst may be increased by the use of fluorine, either by incorporation into the catalyst during its preparation in the form of a suitable fluorine compound or by in situ fluoriding during the operation of the process, as disclosed in GB 1,390,359.

Although the process using an amorphous catalyst for the treatment of the waxy feeds has shown itself to be capable of producing high V.I. lubricants, it is not without its limitations. At best, the technique requires a significant dewaxing capability, both in order to produce the feed as well as to dewax the hydrocracked product to the desired pour point. The reason for this is that although the amorphous catalysts are effective for the saturation of the aromatics under the high pressure conditions which are typically used (about 2,000 psig) their activity and selectivity for isomerization of the paraffinic components is not as high as might be desired; the relatively straight chain paraffins are not, therefore, isomerized to the less waxy isoparaffins of relatively high viscosity index but with low pour point properties, to the extent required to fully meet product pour point specifications. The waxy paraffins which pass through the unit therefore need to be removed during the subsequent dewaxinc, step and recycled, thus reducing the capacity of the unit. The restricted isomerization activity of the amorphous catalysts also limits the single-pass yields to a value below about 50 percent, with the corresponding wax conversion being about 30 to 60%, even though higher yields would obviously enhance the efficiency of the process. The product VI is also limited by the isomerization activity, typically to about 145 at 0° F. pour point in single pass operation. The temperature requirement of the amorphous catalysts is also relatively high, at least in comparison to zeolite catalysts, typically being about 700 to 800° F.

Another approach to the upgrading of waxy feeds to high V.I. lubricant basestocks is disclosed in U.S. Pat. No. 4,919, 788 and Ser. No. 07/382,077 (Mobil Case 4309FC). In this process, a waxy feed, typically a waxy gas oil, a slack wax, or a deoiled wax, is hydroprocessed over a highly siliceous zeolite beta catalyst. Zeolite beta is known to be highly effective for the isomerization of paraffins in the presence of aromatics, as reported in U.S. Pat. No. 4,419,220, and its capabilities are effectively exploited in the process of U.S. Pat. No. 4,919,788 in a manner which optimizes the yield and viscometric properties of the products. The zeolite beta catalyst isomerizes the high molecular weight paraffins contained in the back end of the feed to less waxy materials while minimizing cracking of these components to materials boiling outside the lube range. The waxy paraffins in the front end of the feed are removed in a subsequent dewaxing step, either solvent or catalytic, in order to achieve the target pour point. The combination of paraffin hydroisomerization with the subsequent selective dewaxing process on the front end of the feed is capable of achieving higher product V.I. values than either process on its own and, in addition, the process may be optimized either for yield efficiency or for V.I. efficiency, depending upon requirements.

While this zeolite-catalyzed process has shown itself to be highly effective for dealing with highly paraffinic feeds, the high isomerization selectivity of the zeolite beta catalysts, coupled with its lesser capability to remove low quality aromatic components, has tended to limit the application of the process to feeds which contain relatively low quantities of aromatics: the aromatics and other polycyclic materials are less readily attacked by the zeolite with the result that they pass through the process and remain in the product with a consequent reduction in V.I. The lube yield also tends to be constrained by the low wax isomerisation selectivity at low conversions and by wax cracking out of the lube boiling range at high conversions: maximum lube yields are typically obatined in the 20 to 30 weight percent conversion range (650° F.+ conversion). It would therefore be desirable to increase isomerization selectivity and simultaneously to reduce hydrocracking selectivity in order to improve lube yield while retaining the high VI numbers in the product.

In summary, therefore, the processes using amorphous catalysts can be regarded as inferior in terms of single pass conversion and overall yield because the amorphous catalysts are relatively non-selective for paraffin isomerization but have a high activity for cracking so that overall yield remains low and dewaxing demands are high. The zeolite-catalyzed process, by contrast, is capable of achieving higher yields since the zeolite has a much higher selectivity for paraffin isomerization in the presence of polycyclic components but under the moderate hydrogen pressures used in the process, the aromatics are not effectively dealt with in lower quality feeds and operation is constrained by the differing selectivity factors of the zeolite at different conversion levels.

SUMMARY OF THE INVENTION

We have now found that high quality, high viscosity index (V.I.) lubricants can be readily produced by a wax hydroisomerization process using zeolite catalysts of controlled low acidity at high pressures. The process which we have devised is capable of being operated with feeds of varying composition to produce high quality lube basestocks in good yield, producing low pour point products with very high viscosity indices. Although the product VI is dependent upon the composition of the feed, especially its wax content, high VI values typically above about 140, usually in the range of 140 to 155 may be obtained with the preferred slack wax feeds with values of 143 to 147 being typical. Compared to the process using amorphous catalysts, yields are higher and the dewaxing requirement for the product is markedly lower due to the effectiveness of the process in converting the waxy paraffins, mainly linear and near linear paraffins, to less waxy isoparaffins of high viscosity index.

According the present invention, a petroleum wax feed is subjected to hydroisomerization over a noble metal-containing catalyst of low acidity. In the process, the paraffins present in the feed are selectively converted to isoparaffins of high VI but lower pour point so that a final lube product of good viscometric properties is produced with a minimal degreee of subsequent dewaxing. A low acidity zeolite hydroisomerization catalysts is employed, in which the zeolite component is zeolite beta in one of its low acidity forms. A noble metal, preferably platinum, is used to provide hydrogenation-dehydrogenation functionality in this catalyst in order to promote the desired hydroisomerization reactions. The process is well suited for upgrading waxy feeds such as slack wax with aromatic contents greater than about 15 weight percent to high viscosity index lubricating oils with high single pass yields and a limited requirement for product dewaxing.

The process is operated under high pressure, typically with a hydrogen partial pressure of at least 1000 psig (about 7000 kPa abs), usually from about 1500 to 2500 psig (about 1435 to 17340 kPa abs). The yield benefits associated with the use of the low acidity hydroisomerization catalysts at these high hydrogen pressures are unexpected since the use of high hydrogen pressures with catalysts of higher acidity has been shown to result in lower isomerization selectivity.

DRAWINGS

In the accompanying drawings

DETAILED DESCRIPTION

In the present process feeds with a relatively high wax content are converted to high V.I. lubricants in a hydroisomerization process using a low acidity zeolite hydroisomerization catalyst. The products are characterized by good viscometric properties including high viscosity index, typically at least 140 and usually in the range 143 to 147.

Feed

The present processes are capable of operating with a wide range of feeds of mineral oil origin to produce a range of lubricant products with good performance characteristics, especially of low pour point and high viscosity index. The quality of the product and the yield in which it is obtained is dependent upon the quality of the feed and its amenability to processing by the present catalysts; products of the highest VI are obtained by using the preferred wax feeds described below but products with lower VI values may also be obtained from other feeds which contain a lower initial quantity of waxy components which are converted into high VI iso-paraffins by the isomerization catalyst. The use of feeds with lower wax contents may also result in lower yields, particularly if the feed preparation or processing is carried out under conditions to maximise the VI since then it is necessary to remove the lower quality components at some point or another, with the concomitant effect on yield.

The feeds which may be used should have an initial boiling point which is no lower than the initial boiling point of the desired lubricant. Because this is usually about 650° F. (about 345° C.) or higher, the feed will normally be a 650° F.+ (about 345° C.+) fraction. Feeds of this type which may be used include vacuum gas oils as well as other high boiling fractions such as distillates from the vacuum distillation of atmospheric resids, and raffinates from the solvent extraction of such distillate fractions.

The feed may require preparation in order to be treated satisfactorily in the hydroisomerization step. The preparation steps which are generally necessary are those which remove low VI components such as aromatics and polycyclic naphthenes. Removal of these materials will result in a feed for the hydroisomerization step which contains higher quantities of waxy paraffins which are then converted to high VI, low pour point iso-paraffins. In order to produce the highest quality lubes, i.e. materials having a VI above 140, the feed to the hydroisomerization step should have a VI of at least 130, although lower quality products may be produced by the use of feeds which have lower VI values.

Suitable pre-treatment steps for preparing feeds for the hydroisomerization are those which remove the aromatics and other low VI components from the initial feed. Solvent extraction using a solvent such as furural, phenol or N,N-dimethylformamide is suitable for this purpose, as is hydrotreatment, especially at high hydrogen pressures which are effective for aromatics saturation e.g. 1500 psig (about 10,445 kPa) or higher. Hydrotreatment may be preferred over solvent extraction in view of the losses which take place during the extraction process.

The preferred gas oil and distillate feeds are those which have a high wax content, as determined by ASTM D-3235, preferably over about 50 weight percent. Feeds of this type include, for example, certain South-East Asian and mainland China oils. These feeds usually have a high paraffin content, as determined by a conventional P/N/A analysis. The properties of typical feeds of this type are set out in Tables 1 and 2 below.

TABLE 1

Minas Gas Oil

| | |
|---|---|
| Nominal boiling range, ° C. (° F.) | 345°–540° (650°–1000°) |
| API Gravity | 33.0 |
| Hydrogen, wt % | 13.6 |
| Sulfur, wt % | 0.07 |
| Nitrogen, ppmw | 320 |
| Basic Nitrogen, ppmw | 160 |
| CCR | 0.04 |
| Composition, wt % | |
| Paraffins | 60 |
| Naphthenes | 23 |
| Aromatics | 17 |
| Bromine No. | 0.8 |
| KV, 100° C., cSt | 4.18 |
| Pour Point, ° C. (° F.) | 46 (115) |
| 95% TBP, ° C. (° F.) | 510 (950) |

TABLE 2

HDT Minas Feed

| | |
|---|---|
| Nominal boiling range, ° C. (° F.) | 345–510 (650–950) |
| API Gravity | 38.2 |
| H, wt. pct. | 14.65 |
| S, wt. pct. | 0.02 |
| N, ppmw | 16 |
| Pour Point, ° C. (° F.) | 38 (100) |
| KV at 100° C., cSt | 3.324 |
| P/N/A Wt. % | |
| Paraffins | 66 |
| Naphthenes | 20 |
| Aromatics | 14 |

The preferred feeds for producing the products of the highest viscosity index are petroleum waxes which contain at least 50% wax, as determined by ASTM Test D-3235. In these feeds of mineral oil origin, the waxes are materials of high pour point, comprising straight chain and slightly branched chain paraffins such as methylparaffins.

Petroleum waxes, that is, waxes of paraffinic character are derived from the refining of petroleum and other liquids by physical separation from a wax-containing refinery stream, usually by chilling the stream to a temperature at which the wax separates, usually by solvent dewaxing, e.g., MEK/toluene dewaxing or by means of an autorefrigerant process such as propane dewaxing. These waxes have high initial boiling points above about 650° F. (about 345° C.) which render them extremely useful for processing into lubricants which also require an initial boiling point of at least 650° F. (about 345° C.). The presence of lower boiling components is not to be excluded since they will be removed together with products of similar boiling range produced during the processing during the separation steps which follow the characteristic processing steps. Since these components will, however, load up the process units they are preferably excluded by suitable choice of feed cut point. The end point of wax feeds will vary according to the characteristics of the stream from which the wax has been removed, with distillate (neutral) streams usually giving waxes with end points of not more than about 1050° F. (about 565° C.) but higher boiling wax feeds such as the petrolatum waxes i.e. waxes separated from bright stock may also be employed, these waxes typically having end points up to about 1300° F. (about 705° C.).

The wax content of the preferred feeds is high, generally at least 50, more usually at least 60 to 80, weight percent with the balance from occluded oil comprising iso-paraffins, aromatics and naphthenics. The non-wax content will normally not exceed about 40 weight percent of the wax and preferably will not exceed 25–30 weight percent. These waxy, highly paraffinic wax stocks usually have low viscosities because of their relatively low content of aromatics and naphthenes although the high content of waxy paraffins gives them melting points and pour points which render them unacceptable as lubricants without further processing.

The preferred type of wax feeds are the slack waxes, that is, the waxy products obtained directly from a solvent dewaxing process, e.g. an MEK or propane dewaxing process. The slack wax, which is a solid to semi-solid product, comprising mostly highly waxy paraffins (mostly n- and mono-methyl paraffins) together with occluded oil, may be used as such or it may be subjected to an initial deoiling step of a conventional character in order to remove the occluded oil (Foots Oil) so as to form a harder, more highly paraffinic wax which may then be used as the feed. The Foots Oil contains most of the aromatics present in the original slack wax and with these aromatics, most of the heteroatoms. The deoiling step is desirable, therefore, because it removes the undesirable aromatics and heteroatoms which would otherwise pass through the hydroisomerization step and reduce the VI of the final product. The oil content of de-oiled waxes may be quite low and for this purpose, measurement of the oil content by the technique of ASTM D721 may be required for reproducibility, since the D-3235 test refferred to above tends to be less reliable at oil contents below about 15 weight percent. At oil contents below about 10 percent, however, the advantage of the present zeolitic catalysts may not be as marked as with oil contents of from about 10 to 50 weight percent and for this reason, wax feeds conforming to this requirement will normally be employed.

The compositions of some typical waxes are given in Table 3 below.

TABLE 3

Wax Composition - Arab Light Crude

|  | A | B | C | D |
|---|---|---|---|---|
| Paraffins, wt. pct. | 94.2 | 81.8 | 70.5 | 51.4 |
| Mono-naphthenes, wt. pct. | 2.6 | 11.0 | 6.3 | 16.5 |
| Poly-naphthenes, wt. pct. | 2.2 | 3.2 | 7.9 | 9.9 |
| Aromatics, wt. pct. | 1.0 | 4.0 | 15.3 | 22.2 |

A typical slack wax feed has the composition shown in Table 4 below. This slack wax is obtained from the solvent (MEK) dewaxing of a 300 SUS (65 cST) neutral oil obtained from an Arab Light crude.

TABLE 4

Slack Wax Properties

| API | 39 |
|---|---|
| Hydrogen, wt. pct. | 15.14 |
| Sulfur, wt. pct. | 0.18 |
| Nitrogen, ppmw | 11 |
| Melting point, °C.(° F.) | 57 (135) |
| KV at 100° C., cSt | 5.168 |
| PNA, wt pct: | |
| Paraffins | 70.3 |
| Naphthenes | 13.6 |
| Aromatics | 16.3 |

TABLE 4-continued

Slack Wax Properties

Simulated Distillation:

| % | ° C. | (° F.) |
|---|---|---|
| 5 | 375 | (710) |
| 10 | 413 | (775) |
| 30 | 440 | (825) |
| 50 | 460 | (860) |
| 70 | 482 | (900) |
| 90 | 500 | (932) |
| 95 | 507 | (945) |

Another slack wax suitable for use in the present process has the properties set out in Table 5 below. The characteristic of hydrocracked heavy neutral slack waxes (Fischer Tropsch waxes) are also given in Table 7. This wax is prepared by the solvent dewaxing of a 450 SUS (100 cS) neutral raffinate.

TABLE 5

Slack Wax Properties

| Boiling range, ° F. (° C.) | 708–1053 (375–567) |
|---|---|
| API | 35.2 |
| Nitrogen, basic, ppmw | 23 |
| Nitrogen, total, ppmw | 28 |
| Sulfur, wt. pct. | 0.115 |
| Hydrogen, wt. pct. | 14.04 |
| Pour point, ° F. (° C.) | 120 (50) |
| KV (100° C.) | 7.025 |
| KV(300° F., 150° C.) | 3.227 |
| Oil (D 3235) | 35 |
| Molecular wt. | 539 |
| P/N/A: | |
| Paraffins | — |
| Naphthenes | — |
| Aromatics | 10 |

Hydroisomerization

The paraffinic components present in the original wax feed possess good VI characteristics but have relatively high pour points as a result of their paraffinic nature. The objective of the hydroisomerization is, therefore, to effect a selective transformation of these paraffinic components to iso-paraffins which, while possessing good viscometric properties, also have higher pour points. This enables the pour point of the final product to be obtained without an excessive degree of dewaxing following the hydroisomerization.

Hydroisomerization Catalyst

The catalyst used in the hydroisomerization is one which has a high selectivity for the isomerization of waxy, linear or near linear paraffins to less waxy, isoparaffinic products. Catalysts of this type are bifunctional in character, comprising a metal component on a large pore size, porous support of relatively low acidity. The acidity is maintained at a low level in order to reduce conversion to products boiling outside the lube boiling range during this stage of the operation. In general terms, an alpha value below 20 (see FIG. 3) should be employed, with preferred values below 10, best results being obtained with alpha values below 5.

The alpha value is an approximate indication of the catalytic cracking activity of the catalyst compared to a standard catalyst. The alpha test gives the relative rate constant (rate of normal hexane conversion per volume of catalyst per unit time) of the test catalyst relative to the standard catalyst which is taken as an alpha of 1 (Rate Constant=0.016 sec$^{-1}$) The alpha test is described in U.S. Pat. No. 3,354,078 and in *J. Catalysis*, 4, 527 (1965); 6, 278 (1966); and 61, 395 (1980), to which reference is made for a description of the test. The experimental conditions of the test used to determine the alpha values referred to in this specification include a constant temperature of 538° C. and a variable flow rate as described in detail in *J. Catalysis*, 61, 395 (1980).

Although a variety of molecular sieves may be used, a preferred hydroisomerization catalyst for the second stage employs zeolite beta as a support since this zeolite has been shown to possess outstanding activity for paraffin isomerization in the presence of aromatics, as disclosed in U.S. Pat. No. 4,419,220. The low acidity forms of zeolite beta may be obtained by synthesis of a highly siliceous form of the zeolite e.g with a silica-alumina ratio above about 50:1 or, more readily, by steaming zeolites of lower silica-alumina ratio to the requisite acidity level. Another method is by replacement of a portion of the framework aluminum of the zeolite with another trivalent element such as boron which results in a lower intrinsic level of acid activity in the zeolite. The preferred zeolites of this type are those which contain framework boron and normally, at least 0.1 weight percent, preferably at least 0.5 weight percent, of framework boron is preferred in the zeolite. In zeolites of this type, the framework consists principally of silicon tetrahedrally coordinated and interconnected with oxygen bridges. The minor amount of an element (alumina in the case of aluminosilicate zeolite beta) is also coordinated and forms part of the framework. The zeolite also contains material in the pores of the structure although these do not form part of the framework constituting the characteristic structure of the zeolite. The term "framework" boron is used here to distinguish between material in the framework of the zeolite which is evidenced by contributing ion exchange capacity to the zeolite, from material which is present in the pores and which has no effect on the total ion exchange capacity of the zeolite.

Methods for preparing high silica content zeolites containing framework boron are known and are described, for example, in U.S. Pat. No. 4,269,813; a method for preparing zeolite beta containing framework boron is disclosed in U.S. Pat. No. 4,672,049. As noted there, the amount of boron contained in the zeolite may be varied by incorporating different amounts of borate ion in the zeolite forming solution e.g. by the use of varying amounts of boric acid relative to the forces of silica and alumina. Reference is made to these disclosures for a description of the methods by which these zeolites may be made.

In the preferred low acidity zeolite beta catalysts, the zeolite should contain at least 0.1 weight percent framework boron, preferably at least 0.5 weight percent boron. Normally, the maximum amount of boron will be about 5 weight percent of the zeolite and in most cases not more than 2 weight percent of the zeolite. The framework will normally include some alumina and the silica:alumina ratio will usually be at least 30:1, in the as-synthesized conditions of the zeolite. A preferred zeolite beta catalyst is made by steaming an initial boron-containing zeolite containing at least 1 weight percent boron (as $B_2O_3$) to result in an ultimate alpha value no greater than about 10 and preferably no greater than 5.

The steaming conditions should be adjusted in order to attain the desired alpha value in the final catalyst and typically utilize atmospheres of 100 percent steam, at temperatures of from about 800° to about 1100° F. (about 427° to 595° C.). Normally, the steaming will be carried out for about 12 to 48 hours, typically about 24 hours, in order to obtain the desired reduction in acidity. The use of steaming to reduce the acid activity of the zeolite has been found to be especially advantageous, giving results which are not achieved by the use of a zeolite which has the same acidity in its as-synthesized condition. It is believed that these results may be attributable to the presence of trivalent metals removed from the framework during the steaming operation which enhance the functioning of the zeolite in a manner which is not fully understood.

The zeolite will be composited with a matrix material to form the finished catalyst and for this purpose conventional non-acidic matrix materials such as alumina, silica-alumina and silica are suitable with preference given to silica as a non-acidic binder, although non-acidic aluminas such as alpha boehmite (alpha alumina monohydrate) may also be used, provided that they do not confer any substantial degree of acidic activity on the matrixed catalyst. The use of silica as a binder is preferred since alumina, even if non-acidic in character, may tend to react with the zeolite under hydrothermal reaction conditions to enhance its acidity. The zeolite is usually composited with the matrix in amounts from 80:20 to 20:80 by weight, typically from 80:20 to 50:50 zeolite:matrix. Compositing may be done by conventional means including mulling the materials together followed by extrusion of pelletizing into the desired finished catalyst particles. A preferred method for extruding the zeolite with silica as a binder is disclosed in U.S. Pat. No. 4,582,815. If the catalyst is to be steamed in order to achieve the desired low acidity, it is performed after the catalyst has been formulated with the binder, as is conventional.

The hydroisomerization catalyst also includes a metal component in order to promote the desired hydroisomerization reactions which, proceeding through unsaturated transitional species, require mediation by a hydrogenation-dehydrogenation component. In order to maximize the isomerization activity of the catalyst, metals having a strong hydrogenation function are preferred and for this reason, platinum and the other noble metals such as palladium are given a preference. The amount of the noble metal hydrogenation component is typically in the range 0.5 to 5 weight percent of the total catalyst, usually from 0.5 to 2 weight percent. The platinum may be incorporated into the catalyst by conventional techniques including ion exchange with complex platinum cations such as platinum tetraammine or by impregnation with solutions of soluble platinum compounds, for example, with platinum tetraammine salts such as platinum tetraamminechloride. The catalyst may be subjected to a final calcination under conventional conditions in order to convert the noble metal to the oxide form and to confer the required mechanical strength on the catalyst. Prior to use the catalyst may be subjected to presulfiding as described above for the first stage catalyst.

Hydroisomerization Conditions

The conditions for the hydroisomerization are adjusted to achieve the objective of isomerizing the waxy, linear and near-linear paraffinic components in the waxy feed to less waxy but high VI isoparaffinic materials of relatively lower pour point this end while minimizing conversion to non-lube boiling range products (usually 650° F.–(345° C.–) materials). Since the catalyst used for the hydroisomerization has a low acidity, conversion to lower boiling products is usually at a relatively low level and by appropriate selection of severity, the operation of the process may be optimized for isomerization over cracking. At conventional space velocities of about 1, using a Pt/zeolite beta catalyst with an alpha value below 5, temperatures for the hydroisomerization will typically be in the range of about 600° to about 780° F. (about 315° to 415° C.) with 650° F.+ conversion typically being from about 10 to 40 weight percent, more usually 12 to 30 weight percent, of the waxy feed. However, temperatures may be used outside this range, for example, as low as about 500° F. (260° C.) and up to about 800° F. (about 425° C.) although the higher temperatures will usually not be preferred since they will be associated with a lower isomerization selectivity and the production of less stable lube products as a result of the hydrogenation reactions being thermodynamically less favored at progressively higher operating temperatures. Space velocities will typically be in the range of 0.5 to 2 LHSV (hr.$^{-1}$) although in most cases a space velocity of about 1 LHSV will be most favorable.

The hydroisomerization is operated at hydrogen partial pressures (reactor inlet) of at least 1000 psig (about 7000 KPa), usually 1000 to 3000 psig (7000 to 20785 kPa) and in most cases 1500–2500 psig (1435 to 17340 kPa). Hydrogen circulation rates are usually in the range of about 500 to 5000 SCF/Bbl (about 90 to 900 n.l.l.$^{-1}$). Since some saturation of aromatic components present in the original feed takes place in the presence of the noble metal hydrogenation component on the catalyst, hydrogen is consumed in the hydroisomerization even though the desired isomerization reactions are in hydrogen balance; for this reason, hydrogen circulation rates may need to be adjusted in accordance with the aromatic content of the feed and also with the temperature used in the hydroisomerization since higher temperatures will be associated with a higher level of cracking and, consequently, with a higher level of olefin production, some of which will be in the lube boiling range so that product stability will need to be assured by saturation. Hydrogen circulation rates of at least 1000 SCF/Bbl (about 180 n.l.l.$^{-1}$) will normally provide sufficient hydrogen to compensate for the expected hydrogen consumption as well as to ensure a low rate of catalyst aging.

The relatively low temperature conditions which are appropriate for the paraffin isomerization disfavor cracking reactions but are thermodynamically favorable for the saturation of any lube range olefins which may be formed by cracking, particularly in the presence of the highly active hydrogenation components on the catalyst. Because of this, the hydroisomerization process is also effective for hydrofinishing the product so that product stability is improved, especially stability to ultraviolet radiation. The isomerized product may therefore be subjected simply to a final dewaxing step in order to achieve the desired target pour point and usually there will be no need for any further finishing steps since a low unsaturates content, both of aromatics and of lube range olefins, results from the optimized processing in the two functionally separated steps of the process. The product may be subjected to a final fractionation to remove lower boiling materials, followed by a final dewaxing step in order to achieve target pour point for the product.

Dewaxing

Although a final dewaxing step will normally be necessary in order to achieve the desired product pour point, it is a notable feature of the present process that the extent of dewaxing required is relatively small. Typically, the loss during the final dewaxing step will be no more than 15–20 weight percent of the dewaxer feed and may be lower. Either catalytic dewaxing or solvent dewaxing may be used at this point and if a solvent dewaxer is used, the removed wax may be recycled to the hydroisomerization for a second pass through the isomerization step. The demands on the dewaxer unit for the product are relatively low and in this respect the present process provides a significant improvement over the process employing solely amorphous catalysts where a significant degree of dewaxing is required. The high isomerization selectivity of the zeolite catalysts enables high single pass wax conversions to be achieved, typically about 80% as compared to 50% for the amorphous catalyst process so that unit throughput is significantly enhanced.

Products

The products from the process are high VI, low pour point materials which are obtained in excellent yield. Besides having excellent viscometric properties they are also highly stable, both oxidatively and thermally and to ultraviolet light. VI values in the range of 125 to 150 are typically obtained with the preferred wax feeds to the process and values of at least 140, typically 143 to 147, are readily achievable with product yields of at least 50 weight percent, usually at least 60 weight percent, based on the original wax feed, corresponding to wax conversion values of almost 80 and 90 percent, respectively.

EXAMPLES

The following examples are given in order to illustrate various aspects of the present process. Examples 1 and 2, directly following, illustrate the preparation of low acidity Pt/zeolite beta catalysts containing framework boron.

Example 1

A boron-containing zeolite beta catalyst was prepared by crystallizing the following mixture at 285° F. (140° C.) for 13 days, with stirring:

| | |
|---|---|
| Boric acid, g. | 57.6 |
| NaOH, 50%, ml. | 66.0 |
| TEABr, ml. | 384 |
| Seeds, g. | 37.0 |
| Silica, g. | 332 |
| Water, g. | 1020 |

Notes:
1. TEABR = Tetraethylammonium bromide, as 50% aqueous solution.
2. Silica = Ultrasil (trademark).

The calcined product had the following analysis and was confirmed to have the structure of zeolite beta by X-ray diffraction:

| | |
|---|---|
| $SiO_2$ | 76.2 |
| $Al_2O_3$ | 0.3 |
| B | 1.08 |
| Na, ppm | 1070 |
| N | 1.65 |
| Ash | 81.6 |

Example 2

An as-synthesized boron-containing zeolite beta of Example 1 was mulled and extruded with silica in a zeolite:silica weight ratio of 65:35, dried and calcined at 900° F. (480° C.) for 3 hours in nitrogen, followed by 1000° F. (540° C.) in air for three hours. The resulting extrudate was exchanged with 1N ammonium nitrate solution at room temperature for 1 hour after which the exchanged catalyst was calcined in air at 1000° F. (540° C.) for 3 hours, followed by 24 hours in 100 percent steam at 1025° F. (550°

C.). The steamed extrudate was found to contain 0.48 weight percent boron (as $B_2O_3$), 365 ppm sodium and 1920 ppm $Al_2O_3$. The steamed catalyst was then exchanged for 4 hours at room temperature with 1N platinum tetraammine chloride solution with a final calcination at 660° F. (350° C.) for three hours. The finished catalyst contained 0.87 weight percent platinum and had an alpha value of 4.

Example 3

A sample of an aluminosilicate zeolite beta with a bulk $SiO_2:Al_2O_3$ ratio of 40 was extruded with alumina to produce a 65% zeolite/35% $Al_2O_3$ (by weight) cylindrical extrudate. This material was then dried, calcined and steamed to reduce the alpha to 55. Platinum was incorporated by means of ion exchange using $Pt(NH_3)_4Cl_2$, to a final Pt loading of 0.6 wt. percent.

Example 4

This Example illustrates a wax hydroisomerization process using a low acidity zeolite beta hydroisomerization catalyst. The process was operated under both low (400 psig/2860 kPa) and high (1750 psig/12170 kPa) conditions.

A low acidity silica-bound zeolite beta catalyst prepared by the method described in Example 2 above was charged to a reactor in the form of 30/60 mesh (Tyler) particles and then sulfided using 2% $H_2S$/98% $H_2$ by incrementally increasing the reactor temperature up to 750° F. (400° C.) at 50 psig (445 Kpa abs). The feed was a slack wax having the properties set out in Table 4 below.

TABLE 4

Properties of Slack Wax Feed (30–35% oil)

| | |
|---|---|
| API Gravity | 34.4 |
| Hydrogen, wt % | 14.45 |
| Nitrogen, ppm | 32 |
| Sulphur, wt % | 0.125 |
| Water, ppm | 44 |
| Simulated Distillation, ° F. | |
| 0.5% | 731 |
| 5 | 791 |
| 10 | 821 |
| 20 | 854 |
| 30 | 877 |
| 40 | 899 |
| 50 | 919 |
| 60 | 940 |
| 70 | 964 |
| 80 | 989 |
| 90 | 1019 |
| 95 | 1040 |
| 99.5 | 1084 |
| Unrecovered Amt. | 0.0 |

The slack wax feed was charged directly to the catalyst in cocurrent downflow with hydrogen under the following conditions:

| | |
|---|---|
| LHSV, $hr^{-1}$ | 0.5 |
| $H_2$, Flow Rate, SCF/Bbl (n. 1. 1.$^{-1}$) | 2500 (445) |
| Total Pressure, psig (kPa abs) | 400 and 1750 (2860 and 12170) |

The temperature was varied in the range from 700° to 780° F. (about 370° to 415° C.) to give differing levels of wax conversion from 10 to 30 percent, as discussed below. The results are shown in Table 6 below and in FIGS. 1 and 2.

Example 5

The aluminosilicate zeolite beta catalyst of Example 3 was charged to the reactor and presulfided as described in Example 4 above and then used to hydroisomerize the same slack wax feed under the following conditions:

| | |
|---|---|
| LHSV, $hr^{-1}$ | 1.0 |
| $H_2$, Flow Rate, SCF/Bbl (n. 1. 1.$^{-1}$) | 2000 (356) |
| Total Pressure, psig (kPa abs) | 400 and 2000 (2860 and 13890) |

The temperature was varied from 650° to 750° F. (about 345° to 400° C.) to give differing levels of wax conversion from about 5 to 45 percent, as discussed below. The results are given in Table 6 below and in FIGS. 1 and 2.

Example 6

This Example illustrates the use of an amorphous catalyst in a single stage high pressure hydroprocessing operation.

A $NiW/Al_2O_3$ hydrocracking catalyst with the properties shown in Table 5 was used.

TABLE 5

Properties of $NiW/Al_2O_3$ Catalyst

| | |
|---|---|
| Pore Volume, cc/g | 0.453 |
| Surface Area, $m^2$/g | 170 |
| Nickel, wt % | 4.6 |
| Tungsten, wt % | 23.8 |
| Real Density, g/cc | 4.238 |
| Particle Density, g/cc | 1.451 |

The catalyst was charged to a downflow reactor and sulfided as described in Example 4 above. The catalyst was also fluorided using o-fluorotoluene as a dopant (25 ppm) in the feed. Hydrogen was fed to the reactor together with the same slack wax described in Example 4 in cocurrent downflow under the following conditions, again varying temperature from 700° to 780° F. (about 370° to 415° C.) to vary conversion from about 5 to 75 percent, under the following reaction conditions:

| | |
|---|---|
| LHSV, $hr^{-1}$ | 1.0 |
| $H_2$, Flow Rate, SCF/Bbl (n. 1. 1.$^{-1}$) | 7500 (1335) |
| Total Pressure, psig (kPa abs) | 2000 (13890) |

The lube yields and properties of the resulting lubes are shown in Table 6 below and in FIGS. 1 and 2.

TABLE 6

Lube Yields and Properties

| Example No. | 4 | | 5 | | 4 |
|---|---|---|---|---|---|
| Catalyst | 4α Pt/beta | | 55α Pt/beta | | NiW/alumina |
| Pressure, psig | 400 | 1750 | 400 | 1750 | 2000 |
| Lube yield, wt. pct. | 55–58 | 61 | 51 | 41 | 46 |
| KV, 100° F., cS | 5.8 | 6.0 | 5.8 | 7.0 | 5.0 |
| Lube VI | 135–137 | 133–134 | 127 | 121 | 142 |

Figure 1:
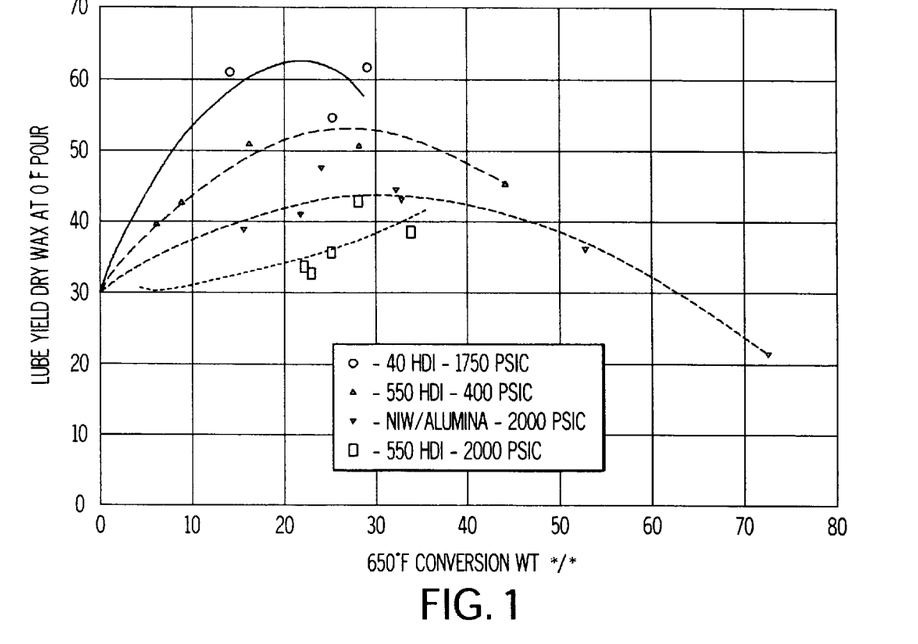
FIGS. 1, 2, and 3 are graphs illustrating the results of wax hydroprocessing experiments reported in the Examples.
Figure 2:
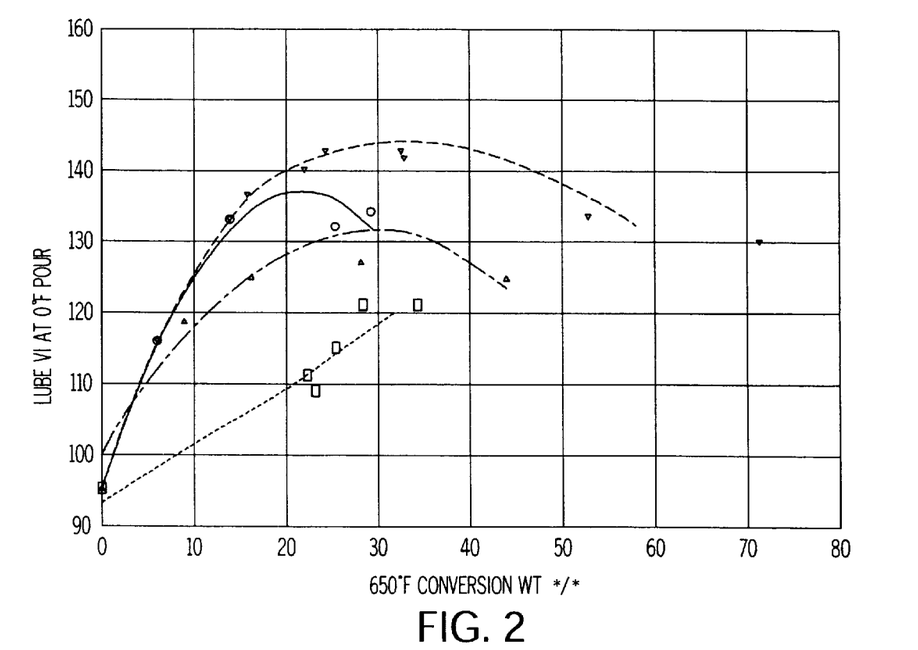

FIGS. 1 and 2 compare the yields and VI data as a function of the slack wax conversion, which is defined here as the net amount of feed converted to 650° F.– (345° C.–). Yield is determined by the amount of 650° F.+ material remaining after solvent dewaxing to achieve a 0° F. (–18° C.) pour point product.

The results summarized in Table 5 and shown in FIGS. 1 and 2 show that slack wax can be processed over a low acidity catalyst such as Pt/zeolite beta at high pressure without the yield and VI penalties incurred with a comparable but more acidic catalyst. These results show that the low acidity Pt/zeolite beta catalyst of Example 2 (4α) produces the highest yield for processing the raw slack wax, as shown by Example 4: the 4α Pt/zeolite beta catalyst produces as much as 15 percent more lube than the amorphous NiW/Al$_2$O$_3$ catalyst used in Example 6 and 10 to 20% more lube than the higher acidity 55α Pt/zeolite beta catalyst used in Example 5. Increasing the operating pressure of the hydroisomerization results in a significant yield loss in the case of the higher acidity Pt/zeolite beta catalyst used in Example 5, but results in a yield increase for the low acidity Pt/zeolite beta catalyst used in Example 4. Product VI is not as strongly affected by pressure with the low acidity Pt/zeolite beta as it is with the higher acidity Pt/zeolite beta catalyst.

Example 7

Figure 3:
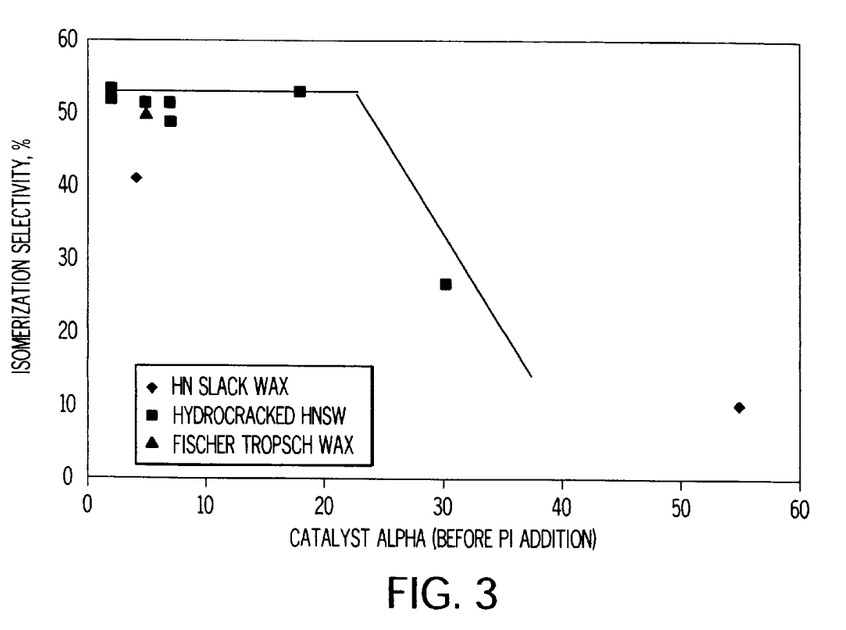

FIG. 3 illustrates the impact of the alpha value on the isomerization selectivity of zeolite beta loaded with platinum. Alpha values were determined prior to platinum addition. The feed in most cases was Hydrocracked Heavy Neutral Slack Wax, the characteristics of which are found in Table 4. The feed characteristic of Heavy Neutral Slack Wax from various sources in addition to Fischer-Tropsch Wax are found in Table 7. One example using Fisher-Tropsch wax is given if FIG. 3. The typical properties of slack wax are found in Table 2. Isomerization selectivity was plotted against catalyst alpha. Alpha values no greater than twenty consistently demonstrated an isomerization selectivity in the range from about 48 to about 53%. When alpha values increased beyond 20, the relationship between isomerization selectivity and alpha values became inversely proportional.

TABLE 7A

Feedstock Properties

Midly HDC'd Fisher-Tropsch Wax

| | |
|---|---|
| C, wt % | 85.66 |
| H, wt % | 14.34 |
| 650° F.–, wt % | 16.7 |
| 6580–850° F., wt % | 25.7 |
| 850–1000° F., wt % | 20.5 |
| 1000° F.+, wt % | 37.1 |
| n-paraffins, wt % | — |
| i-paraffins, wt % | — |
| aromatics, wt % | — |
| Average Carbon Number | — |

TABLE 7B

Physical properties of slack wax feedstock used in the evaluation of the MWI-II process 450 SUS Slack Wax

| | |
|---|---|
| Oil content, wt % (D3235) | 34 |
| Nitrogen, ppm | 32 |

TABLE 7B-continued

Physical properties of slack wax feedstock used in the evaluation of the MWI-II process 450 SUS Slack Wax

| | |
|---|---|
| Sulfur, wt % | .10 |
| kV@100° C., cSt | 7.3 |
| SIMIDIS, wt % | |
| IBP | 736 |
| 5 | 805 |
| 50 | 916 |
| 95 | 1037 |
| EP | 1095 |
| Solvent-Dewaxed Oil | |
| kv@100° C., cSt | 10.53 |
| VI | 96 |
| Pour Point, ° F. | 0 |
| Nitrogen, ppm | 95 |
| Sulfur, wt % | 22 |
| IBP/5% | 731/799 |

TABLE 7C

Properties of Feed Stocks used in CT325 MWI Stability Studies

| | 450" Slack Wax Coryton |
|---|---|
| Oil content, wt. % (D3235) | — |
| Nitrogen, ppm (M1208) | 5 |
| Sulfur, wt. % (m967-1) | <.002 |
| LV @ 100° C., cST | — |
| Simdis, wt. % of/° F. | |
| IBP | 217 |
| 5 | 443 |
| 50 | 879 |
| 95 | 1015 |
| EP | 1293 |

TABLE 7D

Physical Properties of Feedstocks

| | Mildly HDC 450 HNSW |
|---|---|
| Oil content (D3235), % | 48.4 |
| Nitrogen, ppm | 7 |
| Sulfur, ppm | 20 |
| KV @ 100° C., cST | |
| Sun Dist (M1401-1), wt % | |
| IBP | 263 |
| 5 | 473 |
| 10 | 594 |
| 20 | 747 |
| 50 | 865 |
| 90 | 980 |
| FBP | 1063 |
| Distilled solvent Dewaxed Oil | |
| KV @ 100° C., cSt | 6.1 |
| VI @ 0° F. Pour | 138 |
| IBP/5% | |
| 650° F.+ Conversion, % | 16 |
| Wax Conversion (650° F.+ Basis) | 17 |
| 650° F.+ Lube Yield, % | 33 |
| 730° F.+ Lube Yield, % | |

Note:
Mildy hydrocracked fees stocks are stripped TLP's ex CT-163

We claim:

1. A process for producing a high viscosity index lubricant having a viscosity index of at least 125 from a petroleum wax feed having a paraffin content or at least 40 weight percent, which comprises isomerizing waxy paraffins present in the feed to less waxy isoparaffins in the presence of hydrogen partial pressure of at least 1000 psig and in the presence of a low acidity isomerization catalyst, the catalyst comprising a porous support material which is loaded with a noble metal hydrogenation component, the support material comprising zeolite beta, the zeolite beta having an alpha value of not more than 20 and an isomerization selectivity of no less than 48%.

2. The process according to claim 1 in which the feed comprises a petroleum wax having a wax content of at least 60 weight percent and an aromatic content of from 5 to 20 weight percent.

3. A process according to claim 2 in which the isomerization catalyst comprises a boron-containing zeolite beta isomerization catalyst in which the boron is present as a framework component of the zeolite beta.

4. A process according to claim 3 in which the isomerization catalyst comprises from 0.5 to 2 weight percent platinum on a support comprising boron-containing zeolite beta containing boron as a framework component of the zeolite beta and a matrix.

5. A process according to claim 1 in which the hydroisomerization is carried out at a hydrogen partial pressure of from 1000 to 2500 psig.

6. A process according to claim 1 in which the isomerization step is carried out in the presence of hydrogen at a conversion to 650° F.– product of not more than 30 weight percent, based on the feed to the isomerization step.

7. A process according to claim 6 in which the 650° F.– conversion during the isomerization step is from 10 to 20 weight percent based on the feed to the isomerization step.

8. A process according to claim 6 in which the isomerization step is carried out at a temperature not greater than 800° F.

9. A process according to claim 8 in which the isomerization step is carried out at a temperature from 600° to 800° F.

10. A process according to claim 1 in which the hydroisomerized product is subjected to a dewaxing to achieve a target pour point, with a loss during the dewaxing of not more than 15 weight percent.

11. A process according to claim 1 in which the product has a VI of 130 to 150.

12. A process according to claim 1 in which the feed comprises a de-oiled wax, a slack wax Fischer-Tropsch Wax a Hydrocracked Heavy Neutral Slack Wax, or a solvent-refined raffinate.

* * * * *